United States Patent
Kim et al.

(10) Patent No.: US 9,731,736 B2
(45) Date of Patent: Aug. 15, 2017

(54) APPARATUS FOR DETECTING TRAIN POSITION

(71) Applicant: KOREA RAILROAD RESEARCH INSTITUTE, Uiwang-si (KR)

(72) Inventors: Jungtai Kim, Seongnam-si (KR); Jae Ho Lee, Suwon-si (KR); Sungsoo Park, Seoul (KR); Jong Hyen Baek, Seoul (KR)

(73) Assignee: Korea Railroad Research Institute, Uiwang-si (KR)

( * ) Notice: Subject to any disclaimer, the term of this patent is extended or adjusted under 35 U.S.C. 154(b) by 180 days.

(21) Appl. No.: 14/647,823

(22) PCT Filed: Nov. 14, 2013

(86) PCT No.: PCT/KR2013/010353
§ 371 (c)(1),
(2) Date: May 27, 2015

(87) PCT Pub. No.: WO2014/088237
PCT Pub. Date: Jun. 12, 2014

(65) Prior Publication Data
US 2016/0001803 A1    Jan. 7, 2016

(30) Foreign Application Priority Data

Dec. 4, 2012 (KR) .......................... 10-2012-0139853

(51) Int. Cl.
| | |
|---|---|
| *B61L 25/02* | (2006.01) |
| *B61L 25/04* | (2006.01) |
| *G01S 13/06* | (2006.01) |
| *G01S 13/74* | (2006.01) |
| *G01S 5/00* | (2006.01) |

(52) U.S. Cl.
CPC ............ *B61L 25/04* (2013.01); *B61L 25/023* (2013.01); *B61L 25/025* (2013.01); *B61L 25/048* (2013.01); *G01S 5/0009* (2013.01); *G01S 13/06* (2013.01); *G01S 13/74* (2013.01)

(58) Field of Classification Search
CPC .... B61L 1/00; B61L 1/14; B61L 15/00; B61L 25/00; B61L 25/02; B61L 25/021; B61L 25/028; B61L 25/04; B61L 25/041; B61L 25/045
See application file for complete search history.

(56) References Cited

U.S. PATENT DOCUMENTS 5,680,120 A * 10/1997 Tilleman ............... B61L 23/041
                                                                  246/106

FOREIGN PATENT DOCUMENTS

KR    10-2010-0131875 A    12/2010

OTHER PUBLICATIONS

International Search Report of PCT/KR2013/010353 dated Dec. 20, 2013.

* cited by examiner

*Primary Examiner* — R. J. McCarry, Jr.
(74) *Attorney, Agent, or Firm* — LEEPI

(57) ABSTRACT

An apparatus for detecting a position of a train, the apparatus includes a reader. The reader electrically irradiates beams along a plurality of directions toward a tag, combines signals received from the tag and obtains a beam direction information toward the tag, and then detects the position of the train using the beam direction information and a tag information of the tag.

7 Claims, 5 Drawing Sheets

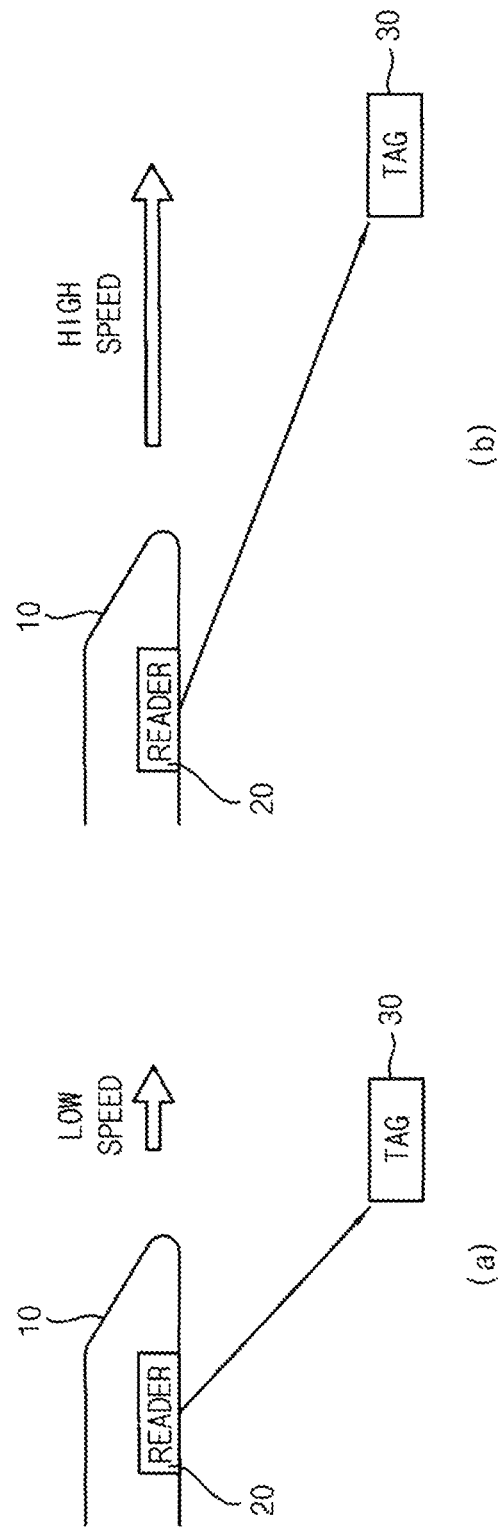

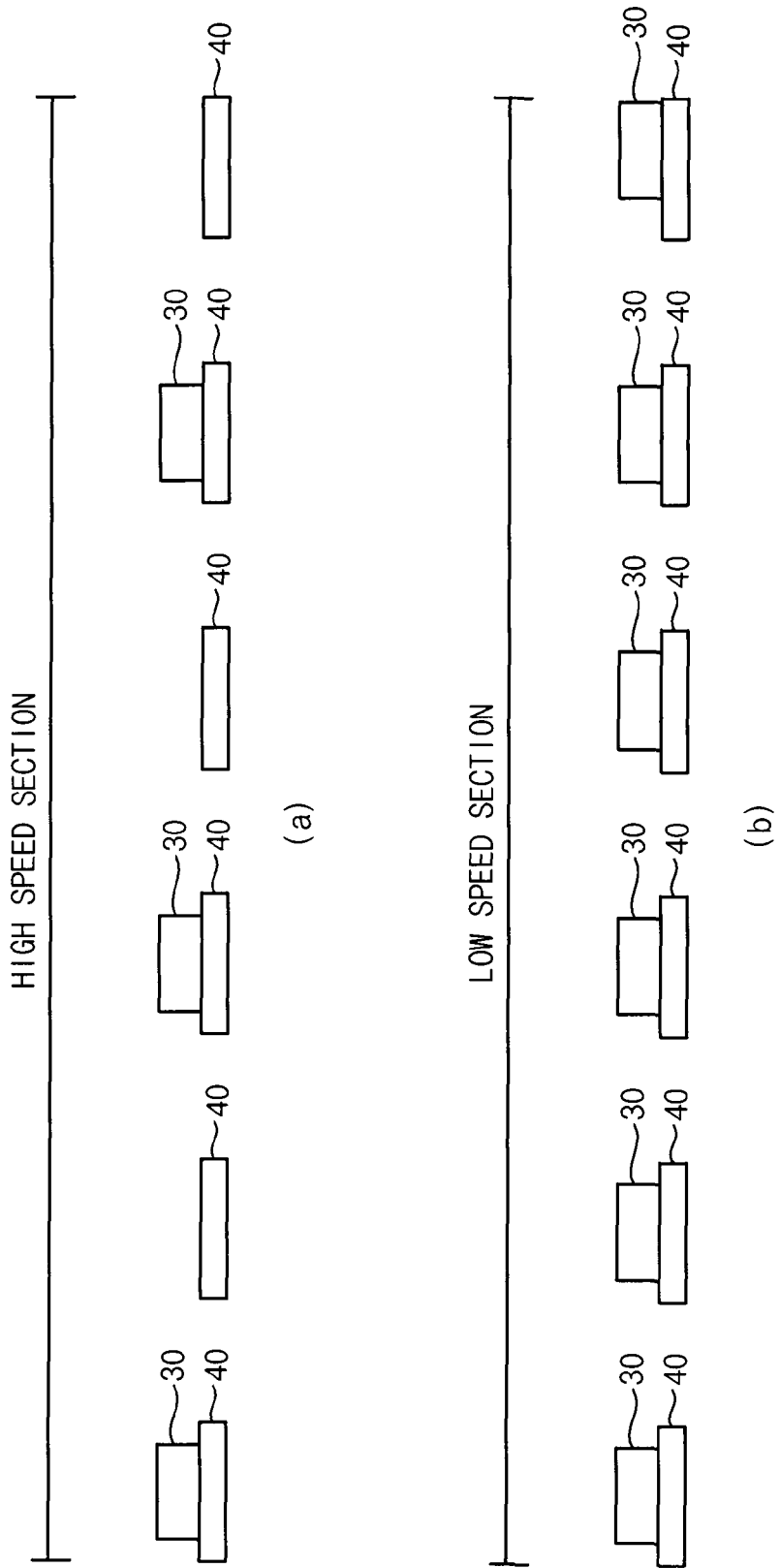

APPARATUS FOR DETECTING TRAIN POSITION

BACKGROUND

1. Field of Disclosure

The present disclosure of invention relates to an apparatus for detecting a position of a train. More particularly, the present disclosure of invention relates to an apparatus for detecting a position of a train in which a beam is irradiated to a tag and thus a contact period between a reader and the tag is increased, such that the position of the train may be more accurately detected.

2. Description of Related Technology

Generally, an apparatus for detecting a position of a train using short range wireless communication such as RFID (Radio Frequency Identification) includes a reader equipped on the train and a tag (or a balise) equipped on a sleeper or a ballast. In a manual RFID system, data in addition to a power are provided to the tag using a wave from the reader, when the reader and the tag is close to each other. Thus, the tag reads the information of the data and provides the information to the reader, and the reader receives the information.

In the conventional RFID system, the reader and the tag make contact with each other within a close distance, and communicate with each other for charging, receiving and transmitting, so that relatively large amount of time is necessary. Thus, time should be enough for the communication between the reader and the tag, to get the information like the position of the train. However, for the high speed train, the contact period between the reader and the tag is decreased, so that the reader may not receive the information from the tag.

To solve the problem, a relatively stronger wave or a relatively wider width beam is used. Alternatively, a frequency may be changed for charging or communication.

However, as the train moves faster, there is a limitation in using the relatively stronger wave or the relatively wider width beam, and the effectiveness is not increased. In addition, the information from another tag is also received, so that the position of the train is hard to be detected.

Further, when the frequency is changed for charging or communication, additional elements should be included in the reader and the tag, so that the cost price for the equipment is increased especially for the tag.

The relating prior art is KR10-2010-0131875 which is for 'Control system of position of train'.

SUMMARY

The present invention is developed to solve the above-mentioned problems of the related arts. The present invention provides to an apparatus for detecting a position of a train in which beams along a plurality of directions are electrically controlled and irradiated and a contact period between a reader and the tag is increased, such that the position of the train may be more accurately detected.

The present invention also provides to the apparatus capable of increasing the accuracy of the detecting.

The present invention also provides to the apparatus capable of decreasing the cost price for equipment for the detecting system.

According to an example embodiment, an apparatus for detecting a position of a train, the apparatus includes a reader. The reader electrically irradiates beams along a plurality of directions toward a tag, combines signals received from the tag and obtains a beam direction information toward the tag, and then detects the position of the train using the beam direction information and a tag information of the tag.

In an example embodiment, the tag information may include a position information of the tag.

In an example embodiment, the reader may include a phase array antenna, a transceiver, a beam generator and a processor. The phase array antenna may irradiate the beams along the directions toward the tag for response of the tag, and receive the signal from the tag. The transceiver may irradiate the beams using the phase array antenna, and process the signals received from the phase array antenna in every antenna channel of the phase array antenna. The beam generator may forms the beams on the signals inputted in every antenna channel from the transceiver to form the beam along the direction toward the tag, and obtain an direction angle of the received beam. The processor may obtain the position of the train using the direction angle inputted in the beam generator and the tag information of the tag.

In an example embodiment, in the beam generator, each signal inputted from the transceiver in every antenna channel may be multiplied by a beam forming weight designating a plurality of phases, all the signals multiplied by the beam forming weight may be overlapped, and then a beam steering angle of the signal having the largest intensity among the overlapped signals may be determined to be the direction angle.

In an example embodiment, the processor may detect the position of the tag using the tag information of the tag, and detect the position of the train using the position of the tag and a distance of the reader with respect to the position of the tag.

In an example embodiment, the distance of the reader with respect to the tag may be measured from as a height and a direction angle between the tag and the reader.

In an example embodiment, the reader may form a beam pattern more narrowly as the distance between the tags is closer.

In an example embodiment, the reader may control the beam direction according to a speed of the train.

According to the example embodiments of the present invention, a beam are generated such that a contact period between the reader and the tag for communicating with each other is increased, and thus the communication may be performed even though the train is moving fast. Therefore, a position of the train may be more accurately detected.

In addition, the beam are generated such that the information may be selectively received and thus adjacent tag is less interfered and a position of the train is compensated according to a speed of the train. Thus, the position of the train may be more accurately detected.

In addition, a conventional tag is used and additional elements are unnecessary, so that the cost price for equipment for the detecting system is decreased.

BRIEF DESCRIPTION OF THE DRAWINGS

The above and other features and advantages will become more apparent by describing exemplary embodiments thereof with reference to the accompanying drawings, in which:

FIG. 6 is a conceptual diagram illustrating a beam irradiation direction of the apparatus in FIG. 1; and FIG. 7 is a block diagram illustrating an equipment of tags in a section of the apparatus in FIG. 1.

<Reference numerals>

| | |
|---|---|
| 10: train | 20: reader |
| 21: phase array antenna | 22: transceiver |
| 23: beam generator | 24: processor |
| 30: tag | 40: sleeper |

DETAILED DESCRIPTION

It should be understood that the exemplary embodiments of the present invention described below may be varied modified in many different ways without departing from the inventive principles disclosed herein, and the scope of the present invention is therefore not limited to these particular flowing embodiments. Rather, these embodiments are provided so that this disclosure will be thorough and complete, and will fully convey the concept of the invention to those skilled in the art by way of example and not of limitation. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiment of the invention will be explained in detail with reference to the accompanying drawings.

Figure 1:
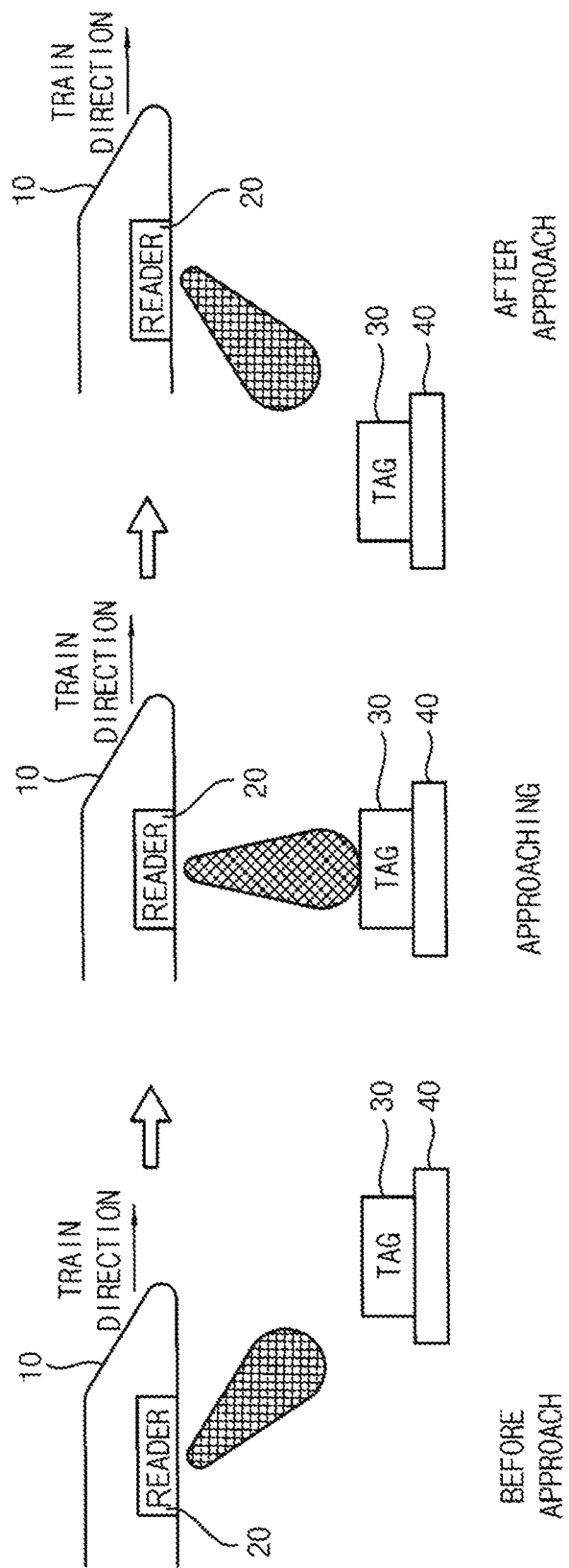
FIG. 1 is a conceptual diagram illustrating an apparatus for detecting a position of a train.

FIG. 1 is a conceptual diagram illustrating an apparatus for detecting a position of a train.

The apparatus for detecting a position of a train according to the present example embodiment detects the position of the train based on RFID (Radio Frequency Identification), and as illustrated in FIG. 1, a reader 20 is mounted on the train 10 and a tag 30 is mounted on a rail.

The reader 20 is equipped on a lower portion of the train 10, and the tag 10 is mounted on a sleeper 40 of the rail. Thus, the reader 20 and the tag 30 are communicated with each other through RF (Radio Frequency) more smoothly when the train 10 passes.

As illustrated in figure, the tag 30 is mounted on the sleeper 40, but the position of the tag 30 is not limited thereto, and the tag 30 may be mounted on various positions to properly detect the position of the train 10.

Here, the reader 20 changes directions of the beam toward the tag 30 via an electronic beam steering method, as illustrated in FIG. 1, so that the reader 20 may communicate with the tag 30 more smoothly in a high speed train.

For example, the reader 20 changes the direction of the beam toward the tag 30 from when the train 10 approaches the tag 30 to when the train 10 passes apart from the tag 30, to increase the contact period between the reader 20 and the tag 30. Thus, the position of the train 10 may be detected more accurately even though the train 10 moves faster.

Hereinafter, the apparatus for detecting a position of a train will be explained more detailed referring to FIGS. 2 to 4.

Figure 2:
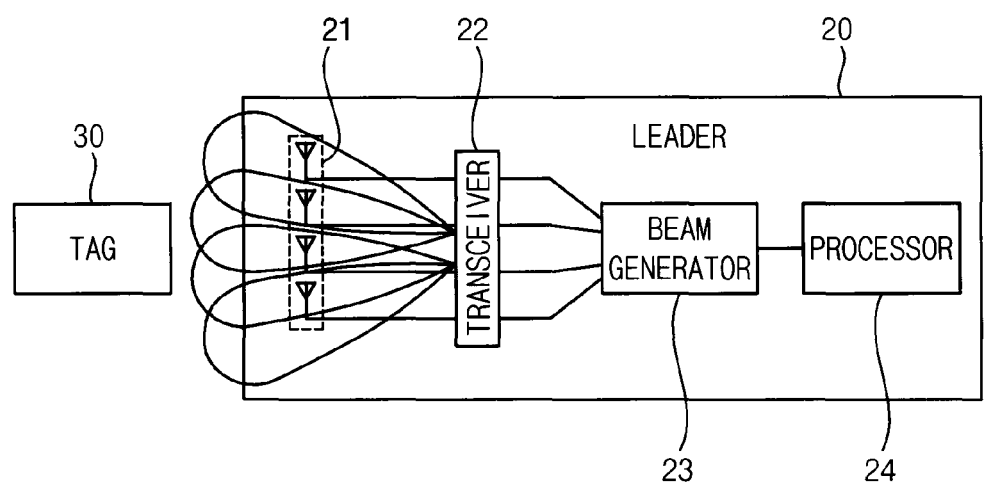
FIG. 2 is a block diagram illustrating the apparatus of FIG. 1.

FIG. 2 is a block diagram illustrating the apparatus of FIG. 1. FIG. 3 is a block diagram illustrating a method for generating a beam of a beam generator of FIG. 2. FIG. 4 is a block diagram illustrating a method for estimating a position of a train using an angle of a beam of a processor. FIG. 5 is a block diagram illustrating a method for removing a tag interference of the apparatus in FIG. 1. FIG. 6 is a conceptual diagram illustrating a beam irradiation direction of the apparatus in FIG. 1. FIG. 7 is a block diagram illustrating an equipment of tags in a section of the apparatus in FIG. 1.

As illustrated in FIG. 2, the apparatus for detecting the position of the train according to the present example embodiment includes the tag 30 and the reader 20.

The tag 30 is equipped on the sleeper 40 and stores original tag information. The tag 30 sends its original tag information to the reader 20, via the power charged by the beam received from the reader 20. The original tag information includes all kinds of information for detecting the position information of the tag 30 like the tag position information and the tag identification information.

The reader 20 is mounted on the train 20, and electrically irradiates the beams along a plurality of directions toward the tag 30. The reader 20 combines the signal received from the tag 30, and obtains the beam direction information toward the tag 30. Then the reader 20 detects the position of the train 10, based on the beam direction information and the tag information.

The reader 20, as illustrated in FIG. 2, includes a phase array antenna 21, a transceiver 22, a beam generator 23 and a processor 24.

The phase array antenna 21 includes a plurality of antennas, and thus irradiates the beams to the directions respectively corresponding to the phases of the antennas, toward the tag 30, and receives the signals from the tag 30.

The transceiver 22 irradiates the beams to the directions different from each other through the phase array antenna 21 based on each phase, and processes the signals received from the phase array antenna 21, for each antenna of the phase array antenna 21.

For example, the transceiver 22 receives the signals in every phase array antenna 21. The transceiver 22 down-converts and samples the frequency of the signal inputted from every antennal channel, and converts the frequency to digital data.

The beam generator 23 forms or generates the beam with respect to the signals inputted in every antenna channel from the transceiver 22 (beam forming process), and then generates the received beam toward the tag 30. Thus, the direction angle of the received beam may be obtained.

The beam generator 23 generates the beam by multiplying the digital data inputted in every antenna channel from the transceiver 22 by a beam forming weight designating L phases.

Figure 3:
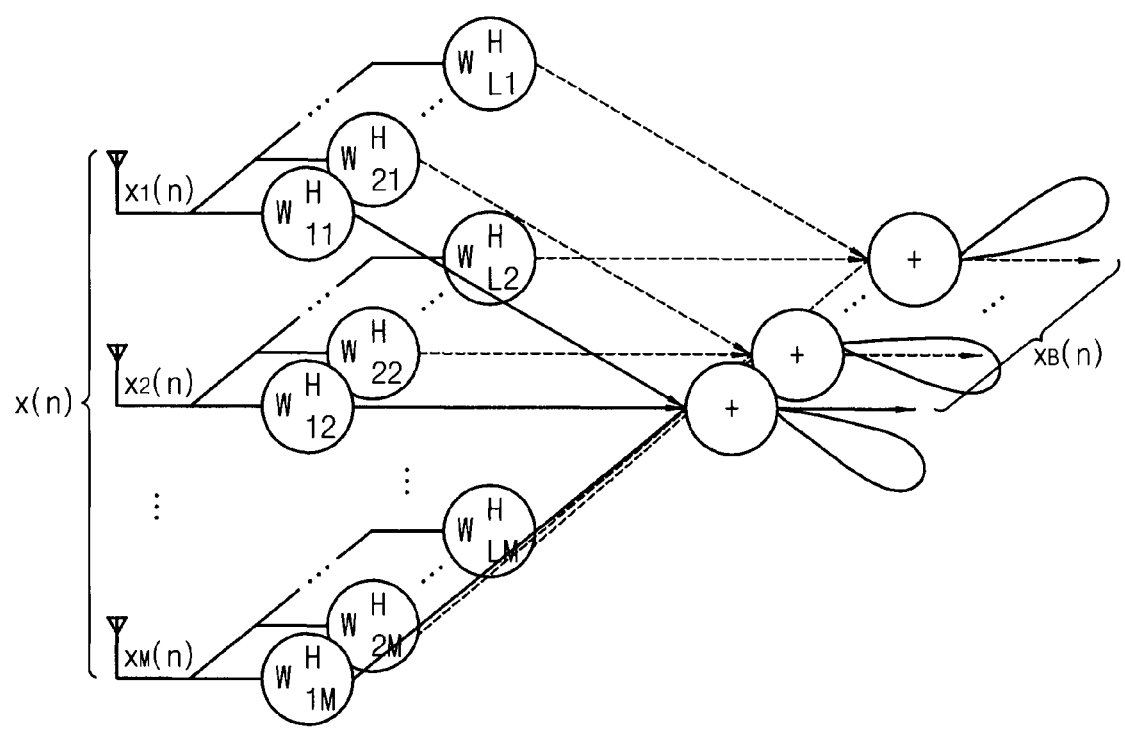
FIG. 3 is a block diagram illustrating a method for generating a beam of a beam generator of FIG. 2.

Referring to FIG. 3, the signal x(n) received from the tag 30 is received by every phase array antenna 21. Here, the beam generator 23 multiplies each of the signals $x_1(n)$, $x_2(n), \ldots, x_M(n)$ received to every phase array antenna 21 by the beam forming weight $(W11^H, W21^H, \ldots, WL1^H)$, $(W12^H, W22^H, \ldots, WL2^H)$, $(W1M^H, W2M^H, \ldots, WLM^H)$ designating the L phases.

For example, the signal $x_1(n)$ received from the tag 30 is multiplied by the beam forming weight $(W11^H, W21^H, \ldots, WL1^H)$ designating the L phase, the signal $x_2(n)$ received from the tag 30 is multiplied by the beam forming weight $(W121^H, W22^H, \ldots, WL2^H)$ designating the L phase, and the signal $x_M(n)$ received from the tag 30 is multiplied by the beam forming weight $(W1M^H, W2M^H, \ldots, WLM^H)$ designating the L phase.

As mentioned above, after multiplying the signals $x_1(n)$, $x_2(n), \ldots, x_M(n)$ received from the tag 30 by the beam forming weight $(W11^H, W21^{11}, \ldots, WL1^H), (W12^H, W22^H, \ldots, WL2^H), (W1M^H, W2M^H, \ldots, WLM^H)$ designating the L phases, the beam generator 23 overlaps the signals multiplied by the beam forming weight $(W11^H, W21^H, \ldots, WL1^H), (W12^H, W22^H, \ldots, WL2^H), (W1M^H, W2M^H, \ldots, WLM^H)$ in every phase array antenna 21 $x_1(n)$, $x_2(n), \ldots, x_M(n)$.

Here, all signals respectively corresponding to L phases overlap with each other, and the signal $x_B(n)$ having the largest intensity among the signals appears. Then, the beam steering angle of the signal having the largest intensity is determined to be the direction angle toward the tag 30.

For example, even though the train 10 moves faster, one of the signal has the largest intensity according to the direction toward the tag 30. Thus, the reader 20 always irradiates the beam toward the tag 30 at all speed of the train 10, so the contact period between the reader 20 and the tag 30 is increased.

Further, the train 10 moves faster, and thus the phase is changed due to Doppler effect based on the speed of the train 10. Thus, the beam generator 23 controls the phase changed due to the speed of the train 10 at every speed of the train 10, based on the predetermined phase correction value, so that the position error of the train 10 according to the speed of the train 10 is corrected. Accordingly the position of the train 10 may be detected more accurately.

The processor 24 detects the position of the train 10 using the direction angle inputted from the beam generator 23 and the tag information.

Figure 4:
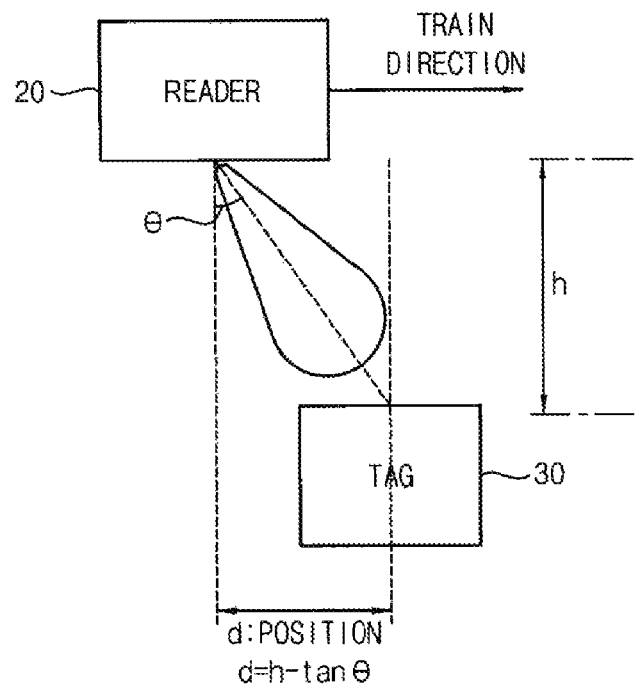
FIG. 4 is a block diagram illustrating a method for estimating a position of a train using an angle of a beam of a processor.
Figure 5:
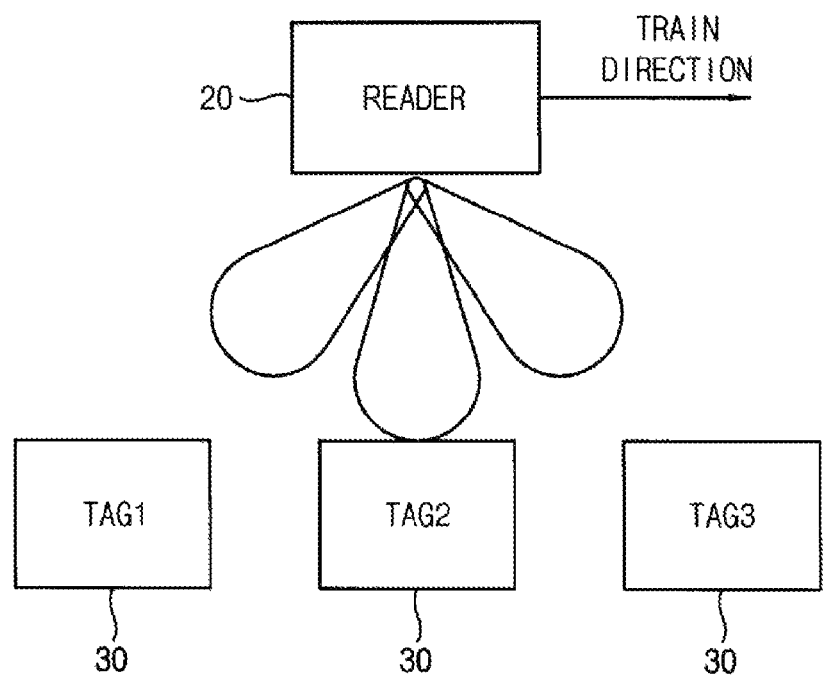
FIG. 5 is a block diagram illustrating a method for removing a tag interference of the apparatus in FIG. 1.

Referring to FIG. 4, the processor 24 uses the height and the direction angle θ between the reader 20 and the tag 30. For example, when the height between the reader 20 and the tag 30 is h, the distance d between the vertical position of the reader 20 and the tag 30 is h×tan θ. Thus, the processor 24 increases the distance d between the vertical position of the reader 20 and the tag 30 based on the information of the position of the tag 30, and detects the position of the train 10 more accurately.

The tags 30 are continuously arranged on the sleeper 40, and thus the interference between the tags 30 may more occur as the distance between the tags is closer. Thus, as illustrated in FIG. 5, the transceiver 22 controls the beam pattern using the phase array antenna 21 as the distance between the tags is closer. Here, the transceiver 22 generates several beams having a relatively low width at the same time as the distance between the tags is closer. Thus, the transceiver 22 individually transceives the information with each of the tags (TAG 1, TAG 2, TAG 3), and thus the position of the train 10 may be detected more accurately based on the tag information and the beam steering information received from each of the tags (TAG 1, TAG 2, TAG 3) by the beam generator 23 and the processor 24.

In addition, in case of transmitting beams, the transceiver 22 may transmit a wide fan beam rather than beams along a plurality of directions. Here, the transceiver 22 controls the direction of the beam according to the speed of the train 10, to control the contact period between the reader 20 and the tag 30.

For example, as illustrated in FIG. 6, when the train 10 moves with a relatively low speed, the contact period between the reader 20 and the tag 30 is increased. Thus, the position of the train is detected accurately even though the direction of the beam heads for the tag relatively close to the reader 20. However, as illustrated in FIG. 6, when the train 10 moves with a relatively high speed, the contact period between the reader 20 and the tag 30 is decreased. Thus, the direction of the beam should be controlled to head for the tag relatively far from the reader 20, to accurately detect the position of the train.

Further, a distance or a strength of a beam to the tags 30 may be controlled considering the speed of the train 10.

Here, as illustrated in FIG. 7, in the relatively low speed section, the distance between the tags 30 is decreased, but in the relatively high speed section, the distance between the tags 30 is increased. Accordingly, the distance between the tags is controlled based on the speed of the train, and thus the position of the train may be detected more accurately.

The foregoing is illustrative of the present teachings and is not to be construed as limiting thereof. Although a few exemplary embodiments have been described, those skilled in the art will readily appreciate from the foregoing that many modifications are possible in the exemplary embodiments without materially departing from the novel teachings and advantages of the present disclosure of invention. Accordingly, all such modifications are intended to be included within the scope of the present teachings. In the claims, means-plus-function clauses are intended to cover the structures described herein as performing the recited function and not only structural equivalents but also functionally equivalent structures.

What is claimed is:

1. An apparatus for detecting a position of a train, the apparatus comprising:
   a reader electrically irradiating beams along a plurality of directions toward a tag;
   a phase array antenna irradiating the beams along the directions toward the tag for response of the tag, and receiving the signal from the tag;
   a transceiver irradiating the beams using the phase array antenna, and processing the signals received from the phase array antenna in every antenna channel of the phase array antenna;
   a beam generator forming the beams on the signals inputted in every antenna channel from the transceiver to form the beam along the direction toward the tag, and obtaining an direction angle of the received beam; and
   a processor obtaining the position of the train using the direction angle inputted in the beam generator and the tag information of the tag;
wherein the reader combines signals received from the tag and obtains a beam direction information toward the tag, and then detects the position of the train using the beam direction information and a tag information of the tag.

2. The apparatus of claim 1, wherein the tag information comprises a position information of the tag.

3. The apparatus of claim 1, wherein in the beam generator, each signal inputted from the transceiver in every antenna channel is multiplied by a beam forming weight designating a plurality of phases, all the signals multiplied by the beam forming weight are overlapped, and then a beam steering angle of the signal having the largest intensity among the overlapped signals is determined to be the direction angle.

4. The apparatus of claim 1, wherein the processor detects the position of the tag using the tag information of the tag, and detects the position of the train using the position of the tag and a distance of the reader with respect to the position of the tag.

5. The apparatus of claim 1, wherein the distance of the reader with respect to the tag is measured from a height and a direction angle between the tag and the reader.

6. The apparatus of claim 1, wherein the reader forms a beam pattern more narrowly as the distance between the tags is closer.

7. The apparatus of claim 1, wherein the reader controls the beam direction according to a speed of the train.

* * * * *